A. DE VILBISS.
BONE FORCEPS.
APPLICATION FILED APR. 6, 1911.
1,002,826. Patented Sept. 12, 1911.
Fig. 1.
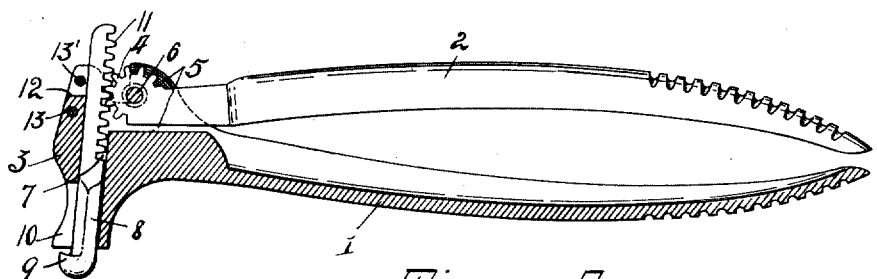
Fig. 2.
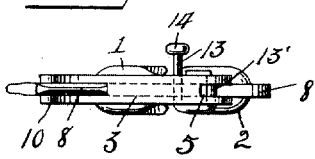
Fig. 3.
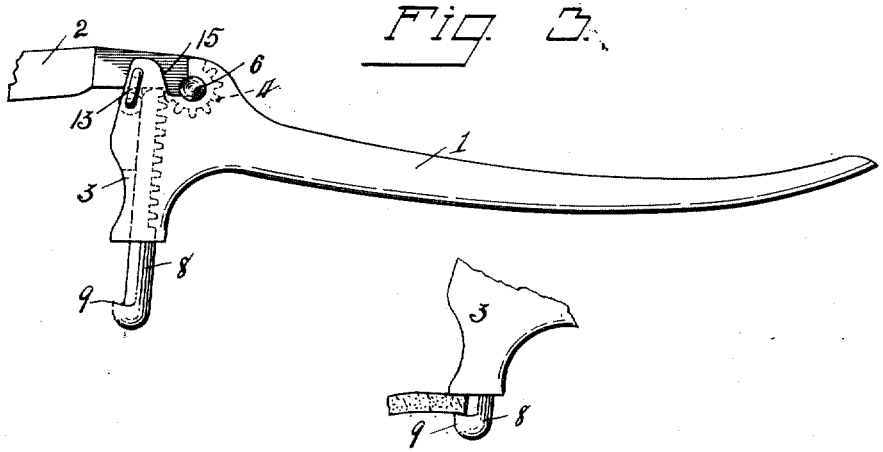
Fig. 4.
WITNESSES:
C. H. Bills.
E. E. Thomas.
INVENTOR.
Allen DeVilbiss,
By Owen & Owen,
His attys.

ALLEN DE VILBISS, OF TOLEDO, OHIO.

BONE-FORCEPS.

1,002,826.   Specification of Letters Patent.   Patented Sept. 12, 1911.

Application filed April 6, 1911.   Serial No. 619,436.

*To all whom it may concern:*

Be it known that I, ALLEN DE VILBISS, a citizen of the United States, and a resident of Toledo, in the county of Lucas and State of Ohio, have invented a certain new and useful Bone-Forceps; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to forceps of the rongeur or bone cutting type, and has for its object the provision of an instrument of this character which is simple and inexpensive in its construction and manufacture, efficient in its operation, and composed of a minimum of parts, which are capable of being easily and quickly assembled or taken apart for the purpose of cleaning, substitution of parts, or for other purposes, as may be desired.

The invention is fully described in the following specification, and while, in its broader aspect it is capable of embodiment in numerous forms, a preferred embodiment thereof is illustrated in the accompanying drawings, in which,—

Figure 1 is a side elevation of an instrument comprising my invention, with a part in central longitudinal section and the members in closed position. Fig. 2 is an end view thereof. Fig. 3 is a side elevation thereof with the handle parts in full open or plunger releasing position, and Fig. 4 is a view of the bone clipping portions of the instrument in the act of cutting a piece of bone.

Referring to the drawings, 1 and 2 designate the two handle levers, the former of which is provided at one end with the enlargement or head 3.

The handle 2 has its inner end provided with a segmental pinion or series of spur teeth 4 and is pivoted within an incut or mortise 5 in the top of the head 3, with its pivot 6 disposed axially of said teeth, as shown.

The head 3 has a plunger way 7 provided substantially in tangential relation to the teeth 4 of the handle 2, with its upper end opening into the mortise 5. A plunger 8 is mounted for reciprocal movements in the way 7 and has its lower end formed with the hooked or forwardly projecting cutting nose 9, which is adapted to work up between the lower forwardly slotted end portion 10 of the head 3 to coöperate therewith in a cutting operation. The plunger 8 is of sufficient length for its upper end portion to work past the toothed end of the handle 2 and has the inner side of such portion toothed in the form of a rack, as at 11, to adapt it to mesh with the teeth 4 and have reciprocatory movements imparted thereto when the handles 1 and 2 are opened and closed, as is apparent. In assembling the parts, the plunger 8 is inserted within the way 7 from the lower end thereof and its rack teeth are engaged with the segmental teeth 4 when the handle 2 is thrown to full open position, or in contact with the surface 12 of the head 3, as shown in Fig. 3, so that upon a swinging of the handle 2 toward the handle 1 the teeth 4 will act on the teeth 11 to impart an in or cutting stroke to the plunger 8. The length of the plunger 8 is so proportioned relative to the length of its stroke that the cutting nose 9 thereof will stand at the desired limit of its instroke when the handles 1 and 2 are in closed position.

In order to prevent an accidental release of the plunger 8 from engagement with the teeth 4 under normal operating conditions the full opening movement of the handle 2 is limited by a stop-pin 13, which is carried by the head 3 for such purpose. This pin in the present instance, projects transversely through the head 3 below the stop-surface 12, thence bends upward and inward in U-shape with its upper leg 13′ shorter than the other, but of sufficient length to project across the space which is formed above the surface 12 by a forward extension of the mortise 5 and to work in registering apertures provided in the side walls of said mortise. The length of the long leg of the pin 13 permits a sufficient movement thereof to withdraw the short leg from lever-handle obstructing position, and such movement is limited by a head or enlargement 14 on the pin. To release the plunger from the teeth 4 or to engage it therewith, it is only necessary to move the pin 13 so that its short leg is withdrawn from across the mortise 5, and the handle 2 can then be moved into contact with the surface 12.

To facilitate a separation or assembling of the handles 1 and 2 the walls of the mortise 5 of the head 3 are provided from the tops thereof with angled or L-shaped notches 15, in the lower rear ends of which the trunnions or ends of the fulcrum pin 6, which are fixed to the handle 2, normally bear. When a plunger 8 has been removed from engagement with the handle teeth 4 the bearing notches 15 permit relative disengaging movements of the two handles, as is apparent.

It is evident that I have provided a forceps of the rongeur type, the plunger or movable jaw of which is capable of a longer stroke and also a more powerful cutting action, due to the shortness of the short arm of the plunger coacting lever handle, than is possible with the forceps of similar size heretofore used, and also that the length of the plunger stroke can be changed by increasing the radii of the set of teeth 4, the size of the head 3 being changed accordingly.

I wish it understood that my invention is not limited to any specific construction or arrangement of the parts, except in so far as such limitations are specified in the claims.

Having thus described my invention, what I claim as new and desire to secure by Letters Patent, is,—

1. In an instrument of the class described, a pair of pivotally connected lever handles one of which has a head, a plunger movable in said head for coöperating therewith to clip an interposed substance, said plunger and one of said lever handles having rack and pinion connection and being capable of disengagement when the lever handles are relatively moved to a predetermined position, and means serving to prevent a movement of the handles to such predetermined position.

2. In an instrument of the class described, a pair of pivotally connected lever handles, a plunger mounted in a portion of one of said handles and adapted to coöperate therewith to clip an interposed substance, said plunger and the other of said lever handles having rack and pinion engagement and being capable of disengagement when the handles are at a predetermined point in an opening movement thereof, and a stop-pin carried by the portion of the lever handle in which the plunger works and serving to limit the said opening movements of the handles to prevent an accidental disengagement of the plunger and coacting handle.

3. In an instrument of the class described, a lever handle having a head, a plunger movable in said head and forming a cutting jaw, and a second lever handle pivoted to said head and capable of separation therefrom, said plunger and second lever handle having rack and pinion connection and being capable of disengagement to permit a removal of the plunger from the head when the second lever handle is in one position relative to the head.

4. In an instrument of the class described, a lever handle having a head, a plunger movable in said head and adapted to coöperate therewith to cut an interposed substance, a second lever handle pivoted to the head, said plunger and second lever handle having rack and pinion engagement and being capable of disengagement to permit a removal of the plunger from the head when the second lever handle is in one position relative to the head, and said second lever handle being capable of quick removal from the head when the plunger has been removed therefrom.

5. In an instrument of the class described, a lever handle having a head, the top of which is mortised with the walls of such mortise angularly notched, a plunger movable in the head, and a second lever handle having trunnions removably mounted in said notches, said plunger and second lever handle having rack and pinion engagement and capable of disengagement when the lever handle is in one position of its pivotal movement relative to the head.

In testimony whereof, I have hereunto signed my name to this specification in the presence of two subscribing witnesses.

ALLEN DE VILBISS.

Witnesses:
C. W. OWEN,
C. H. BILLS.

---

Copies of this patent may be obtained for five cents each, by addressing the "Commissioner of Patents, Washington, D. C."